United States Patent
Pöllinger et al.

(10) Patent No.: US 12,448,013 B2
(45) Date of Patent: Oct. 21, 2025

(54) UPHOLSTERY STRUCTURE OF A VEHICLE SEAT WITH SPRING ELEMENTS

(71) Applicant: GRAMMER Aktiengesellschaft, Ursensollen (DE)

(72) Inventors: Thomas Pöllinger, Regensburg (DE); Christopher Neidl, Schmidgaden (DE); Sebastian Wegmann, Regensburg (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 169 days.

(21) Appl. No.: 18/473,445

(22) Filed: Sep. 25, 2023

(65) Prior Publication Data
US 2024/0116548 A1 Apr. 11, 2024

(30) Foreign Application Priority Data
Oct. 6, 2022 (DE) ...................... 10 2022 125 860.2

(51) Int. Cl.
| | |
|---|---|
| *B61D 33/00* | (2006.01) |
| *B60N 2/68* | (2006.01) |
| *B60N 2/70* | (2006.01) |

(52) U.S. Cl.
CPC ....... *B61D 33/0042* (2013.01); *B60N 2/7035* (2013.01); *B60N 2/707* (2013.01); *B60N 2/686* (2013.01)

(58) Field of Classification Search
CPC ...... B60N 2/7035; B60N 2/707; B60N 2/686; B61D 33/0042
See application file for complete search history.

(56) References Cited

U.S. PATENT DOCUMENTS

| | | | |
|---|---|---|---|
| 6,546,578 B1 * | 4/2003 | Steinmeier | B60N 2/7035 5/724 |
| 6,851,755 B2 * | 2/2005 | Dinkel | A47C 31/126 297/284.6 |
| 2018/0000257 A1 | 1/2018 | Poppe | |

FOREIGN PATENT DOCUMENTS

| | | |
|---|---|---|
| CN | 214648277 | 11/2021 |
| DE | 10132548 | 2/2003 |
| DE | 102014004983 | 10/2015 |
| EP | 1293152 | 3/2003 |

OTHER PUBLICATIONS

Official Action for Germany Patent Application No. 102022125860.2, dated Jul. 7, 2023, 10 pages.
Extended European Search Report for Europe Patent Application No. 23192565.2, dated Feb. 2, 2024, 8 pages.
Official Action for U.S. Appl. No. 18/473,445, dated May 13, 2025, 11 pages.

* cited by examiner

*Primary Examiner* — Milton Nelson, Jr.
(74) *Attorney, Agent, or Firm* — Sheridan Ross P.C.

(57) ABSTRACT

The invention relates to a vehicle seat, in particular for rail transport, with a seat part, with a backrest part and with a soft upholstery section arranged on at least one hard seat plate for upholstering a seat surface of the seat part, in which the upholstery section has an upholstery cover on the upper side and an upholstery foam section which covers the entire surface of the upholstery cover, the upholstery foam section having at least one recess on the underside in which a plurality of foam spring elements arranged next to one another in the form of hollow cylinders are embedded.

17 Claims, 5 Drawing Sheets

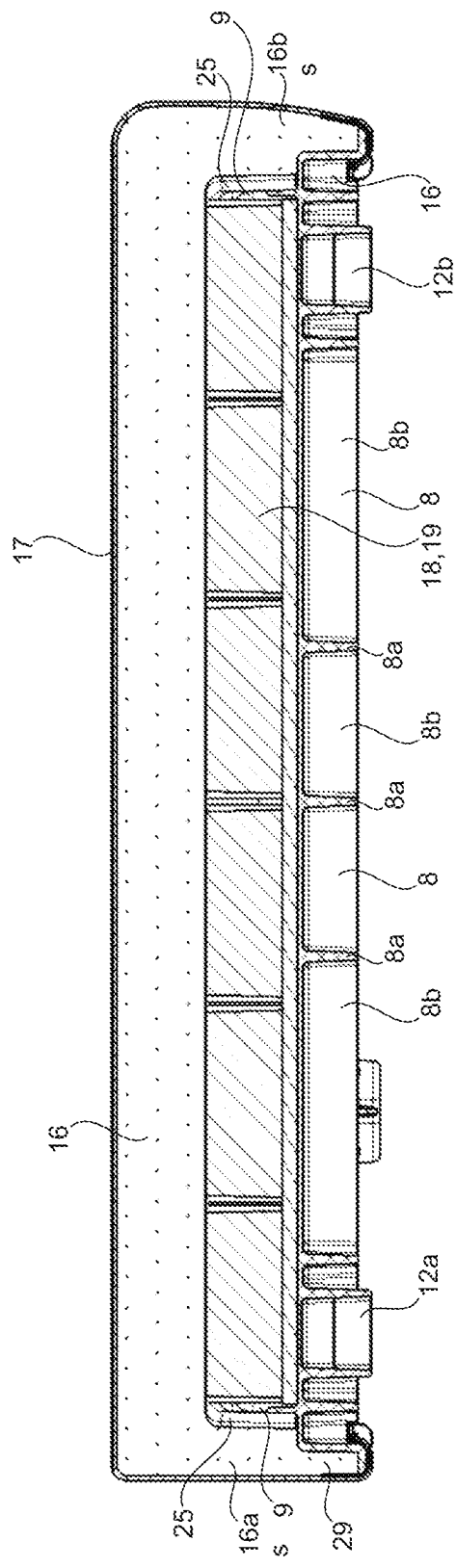

UPHOLSTERY STRUCTURE OF A VEHICLE SEAT WITH SPRING ELEMENTS

CROSS REFERENCE TO RELATED APPLICATION

This application claims the benefit of German Patent Application No. 10 2022 125 860.2, filed Oct. 6, 2022, the contents of which are incorporated herein by reference in its entirety.

FIELD

The invention relates to a upholstery structure of a vehicle seat with spring elements according to the preamble of claim 1.

BACKGROUND

Vehicle seats with a seat part and a backrest, which have a upholstery section in the seat part which is sprung, are sufficiently known. For example, such upholstery sections are provided with numerous cavities and recesses in their upholstery structure in order to thereby obtain a springy effect within the upholstery section. Naturally, in a mass-produced product such as a vehicle seat, it is desirable that the actual spring effect is already present in the upholstery section within an associated upholstery foam section, which is why such recesses and cavities are provided in a wide variety of ways within the upholstery foam section. This can also be designed differently along the course of the seat section surface, but the aim is that such an upholstery foam section can be foamed in a single operation in order to reduce manufacturing costs and enable rapid production of a large number of vehicle seats.

Although vehicle seats constructed in this way with upholstery foam sections that are springy in themselves have the advantage that they can be produced in a few work steps, the springy effects of these upholstery foam sections are limited because a different springy effect can only be achieved poorly in different local areas of the surface of the seat part. This is due to the fact that in an upholstery foam section, the foam section material is foamed and formed in one-part form, and therefore, when a seat part is viewed from above, adjacent local areas strongly influence with their spring effect the local area where the desired spring effect is to be achieved.

SUMMARY

Accordingly, it is the object of the invention to provide a vehicle seat with a seat part and a backrest part as well as an upholstery section, which makes it possible to produce an individual spring function on the smallest surface section on the surface of the seat part when the seat part is stressed by a seat user.

This task is solved according to a vehicle seat, in particular for rail transport, having a seat part, having a backrest part and having a soft upholstery section arranged on at least one hard seat plate for upholstering a seat surface of the seat part, in which the upholstery section has an upholstery cover on the upper side and an upholstery foam section which covers the entire surface of the upholstery cover.

The core idea of the invention is that, in the case of a vehicle seat having a seat part, having a backrest part and having a upholstery section arranged on at least one seat plate for upholstering a seat surface of the seat part, in which the upholstery section has an upholstery cover on the upper side and a upholstery foam section which covers the entire surface of the upholstery cover, the upholstery foam section has, on the underside, at least one recess in which a plurality of foam spring elements arranged next to one another in the form of hollow cylinders are embedded.

Such a knitted fabric is advantageously produced with a knitting machine. This advantageous use of a knitted fabric permits a high degree of variability in the design of the areas with different elasticities. Such knitted fabrics can advantageously have both flexible and rigid, or firm, sections. Compared to conventional woven fabrics, knitted fabrics can be produced very simply, inexpensively and in a manner specific to the application.

A knitted fabric can be produced by certain yarns, preferably the yarn has at least one of the following properties maximum tensile strength at most 60 N, elongation at most 20% and material polyester or at least partly made of polyester.

It is likewise conceivable that different knitted fabrics used are present, which can have different patterns.

Advantageously, the seat plate is made of a hard, stiff material and the upholstery section is made of a soft material. Thus, in principle, a soft upholstery section is arranged on a hard seat plate, but within the associated upholstery foam section, with the aid of a recess within this foam section, the plurality of hollow-cylinder-shaped foam elements arranged next to one another are embedded.

Depending on the diameter of these hollow-cylindrical, preferably upright and juxtaposed spring elements, any locally limited, individual spring behavior or spring function can be achieved when the seat part is stressed by a seat user. This is achieved regardless of whether or not a similar spring function is required in the adjacent local area of the seat part. Because the individual hollow-cylinder-shaped spring elements are arranged next to one another and are preferably not connected to one another, each hollow-cylinder-shaped spring element can individually perform a spring function depending on which recesses or cavities are arranged within the adjacent spring element. A neighboring hollow-cylinder-shaped spring element can have a completely different spring force and spring function, for example by having a different material and/or other recesses or the like. This makes it possible to create individual spring areas with limited surface area that provide a high degree of seating comfort. For example, pelvic bones of a seated user may experience a softer spring function than preceding thighs, which should rather experience a harder spring force as a counterforce from the upholstery foam section.

Despite the arrangement of the many hollow-cylindrical spring elements inside a recess in the upholstery foam section, which is arranged on the underside of the upholstery foam section, a continuous surface of the upholstery foam section is advantageously formed on the upper side, which is necessary to support the upholstery cover over its entire surface. The upholstery cover must not only have a continuous surface of the upholstery foam section as a basis, which would not be ensured by individual cylindrical spring elements arranged next to each other in an upright position, but must also have basic stability against damage, especially in the railway area. In addition, it is important that the upholstery foam section is preferably at least twice as thick in its entire thickness as the height of the spring elements, so that the thickness of the layer of the upholstery foam section above the spring elements is just as thick. This results in a good feeling of comfort for the seat user. Alternatively, however, this overall thickness of the upholstery foam section may be less than twice the height of the spring elements, which means that a layer of the upholstery foam section covering the spring elements in this case has a thickness less than the height of the spring elements. In the previous case, the thickness of this layer is at least equal to the height of the upright hollow cylindrical spring elements.

According to a preferred embodiment, the hollow-cylindrical spring elements, which are preferably made of foam, have longitudinal axes extending perpendicularly to a seat plane of the seat part. Insofar as a seat plate extending beneath these spring elements arranged side by side has a flat surface, all longitudinal axes of these spring elements are arranged parallel to one another. Of course, such spring elements may have different heights to also create different heights at the top of the upholstery foam section and the upholstery cover. For example, the side cheek areas of the seat part or the upholstery section could be designed higher than the areas at the top of the seat part, which are arranged more centrally.

In this way, a more comfortable seating position is created. As already mentioned, this can be achieved by varying the heights of the individual spring elements and by an upholstery foam section extending above and to the sides.

Alternatively, all the spring elements, which are cylindrical in shape, can be of the same height and instead the seat plate itself can have different height sections on the top of the seat part to create different seating areas. In this way, the spring elements located thereon are supported at different heights. For example, in the lateral area, i.e. to the left and right of where the thighs of a seat user rest, the seat plate can extend upwards and have a higher level or sloping arrangement than in the central area where the thighs and buttocks of the seat user are located.

Preferably, a foam mat extending in the seat plane of the seat part is arranged between an underside of the cylindrical fe-der element and the seat plate. This foam mat, which extends in the width and longitudinal direction of the seat part, can also be of different thicknesses. Alternatively, it can have the same thickness over its entire length. Such a thickness of the foam mat can be selected from an area of 0.5 mm-20 mm, preferably 1-10 mm can be selected. The arrangement of this foam mat serves to keep the individual cylindrical spring elements well positioned at the front in the position which, viewed in terms of area, is intended for local springing with an intended spring force. In addition, the foam mat ensures that the individual spring elements are not damaged or worn down by the inherently stiff or slightly elastic seat plate made of hard plastic due to frequent spring loading.

Furthermore, a nonwoven fabric with a layer thickness in the area of 0.05-5 mm, preferably 0.1-0.5 mm, is preferably arranged between the upper sides of the hollow-cylindrical spring elements and the underside of the upholstery foam section. This fleece layer serves to ensure a certain sliding movement between the underside of the upholstery foam section and the upper sides of the spring elements. This is to ensure that the spring elements, which face upwards with their cylindrical end faces, do not catch on each other when spring force is applied or when the seat is occupied and would then stand at an angle. Due to the arrangement of a fleece, the end faces and thus the cylindrical spring elements are always moved back to their initial position.

Advantageously, this multiplicity of hollow-cylindrical spring elements is held together mainly by the arrangement of the recess within the upholstery foam section. Due to this recess on the underside of the upholstery foam section, which expands like a surface, all the cylindrical spring elements are surrounded laterally, which is why none of these cylindrical spring elements can escape upwards or to the side. This allows an orderly alignment and arrangement of all cylindrical spring elements.

This together holding can be further strengthened by the seat plate having an upwardly extending edge web surrounding or subdividing the hollow-cylindrical spring elements and projecting into the at least one recess. In other words, the seat plate has an upwardly extending outer rim of hard plastic material or metal material, for example, which has the function of holding the cylindrical spring elements together. This is done in addition to the downwardly extending side edge of the upholstery foam section.

In order to be able to make the individual hollow-cylindrical spring elements springy, they are designed with their foam material in such a way that they have numerous recesses and hollow chambers in a wide variety of shapes and orientations. For example, the recesses can be in the form of slots extending both in the vertical direction of the hollow cylindrical spring elements and radially in the direction of a central longitudinal axis of each spring element. As a result, the cylinder walls of the spring element can be provided with different spring action and spring force when viewed in the height direction, depending on the direction, extent, dimensions and number of such slots.

Each hollow-cylindrical spring element preferably has a height from an area of 1-100 mm, preferably 5-50 mm, even more preferably 10-30 mm.

An outer diameter of each hollow-cylindrical spring element is selected from an area of 5-300 mm, preferably 10-100 mm, more preferably 30-80 mm.

According to a particularly preferred embodiment, the vehicle seat is designed in such a way that the seat part, viewed in the seat longitudinal direction, has a different spring force or spring pressure at the edge than in the seat center. This is achieved by the recess in the upholstery foam section having spring elements with a higher spring pressure at the edge in the area of the seat user's laid-down thighs than spring elements in the central area of the seat section. These different springs or spring forces, which are mostly seen in the longitudinal direction of the cylindrical spring elements, i.e. in the height direction or from top to bottom or from bottom to top, can be achieved by means of recesses in the form of slots or other cavities already described, by means of different material compositions, by means of different heights of the cylinders, by means of different wall thicknesses of the hollow cylindrical elements, etc.

Further advantageous embodiments result from the sub-claims.

BRIEF DESCRIPTION OF THE DRAWINGS

The figures show:

FIG. 5 in a cross-sectional view a seat part of the vehicle seat according to the present invention.

DETAILED DESCRIPTION

Figure 1:
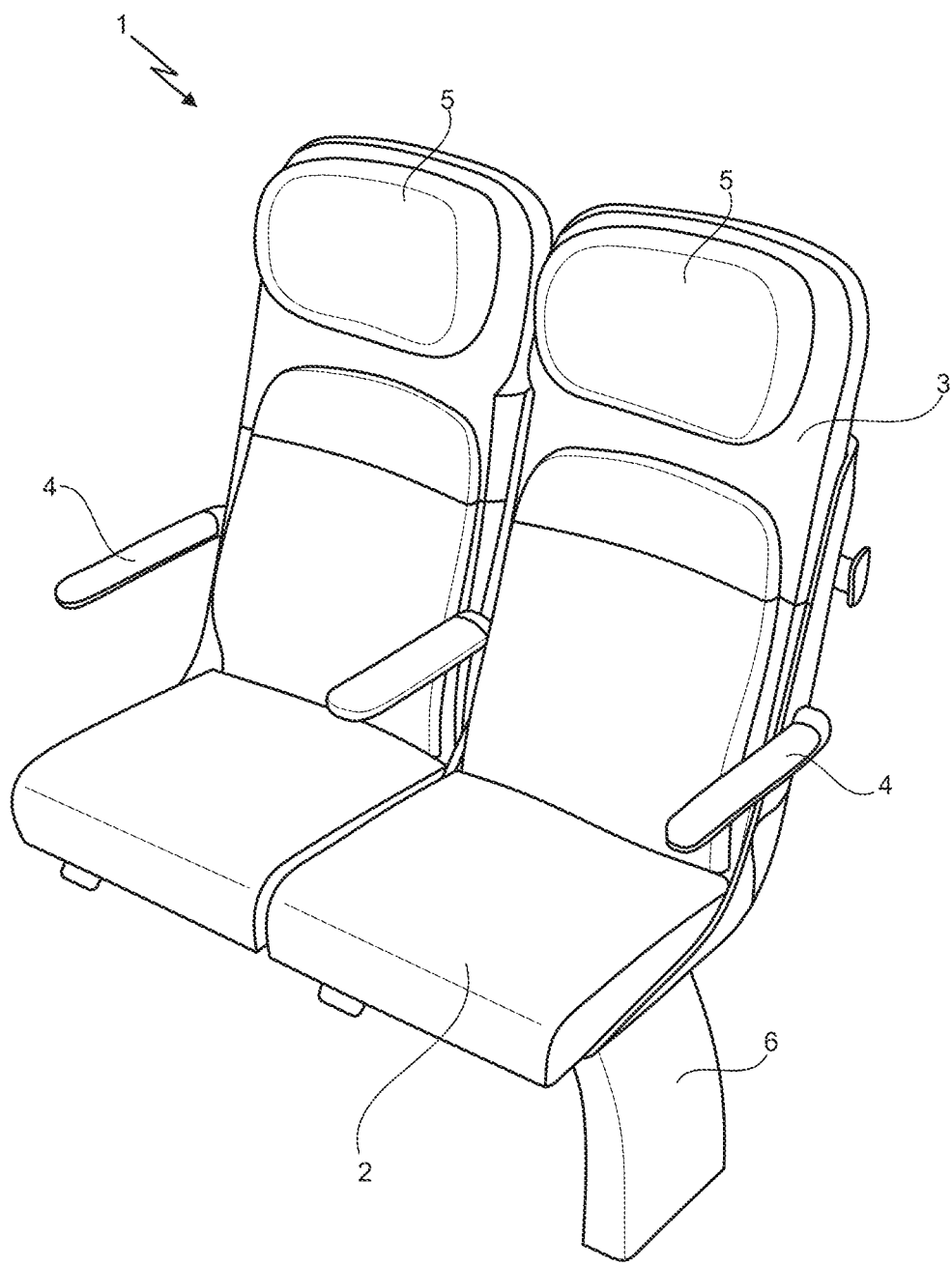
FIG. 1 in a perspective view a double track seat as may be provided for the subject matter of the present invention.

FIG. 1 shows in a perspective view a double track seat which may have the essential features of the present invention. Such a double track seat 1 consists essentially of a seat part 2, a backrest part 3, armrests 4, head rests or head parts 5 and a cantilever-type seat base 6.

Figure 2:
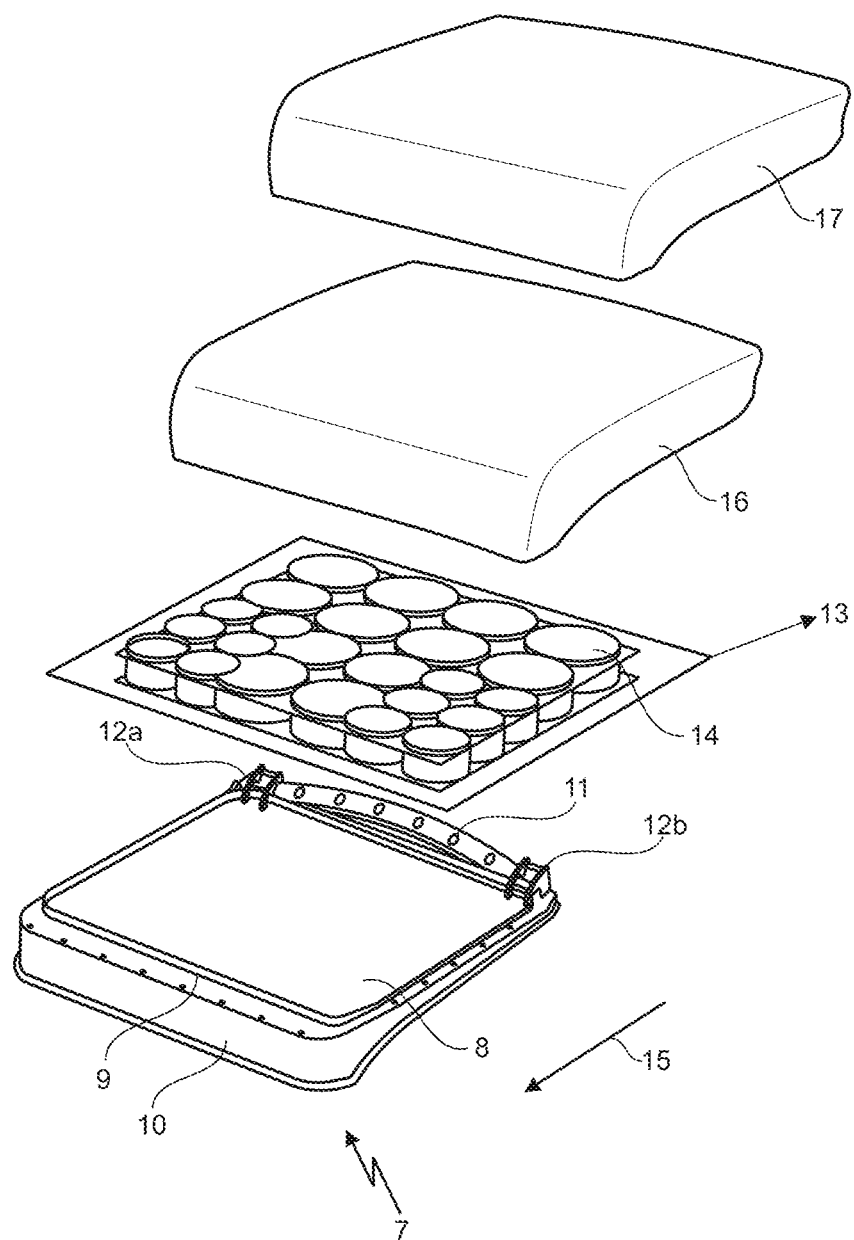
FIG. 2 in a perspective exploded view of the structure of a seat part of the vehicle seat according to the subject matter of the present invention.

In FIG. 2, the seat part 2 according to the subject matter of the present invention is shown in explosion view 7 and perspective view.

A seat longitudinal direction or an orientation of a seat user in the longitudinal direction of the vehicle is reproduced according to the arrow 15.

The seat part 2 in the exploded view 7 has a seat plate 8 on its underside, which has an upwardly extending edge region 9 that can be of fin-like design. The purpose of this fin-like edge region is to hold, or rather to fix, feather elements 14 in a controlled manner on the seat plate with the aid of a recess, which is still to be described, in an underside of an upholstery foam section 16. This fin-like edge area is arranged on a kind of base plate 10 with different heights. All seat plate parts can be made of hard plastic, metal, or both.

At two hinge-like devices 12a and 12b arranged thereon, a backrest can be hooked in a simple manner and swiveled to the seat part 2. A perforated strip 11 is also provided for this purpose, which extends in the transverse direction of the seat part 2 and to which this backrest part 3 can be attached.

With the reference sign 13, the section of the spring elements is shown as it can be embedded as a complete package in a recess on the underside of the upholstery foam section 16 and thus disappear. This section 13 consists of cylindrical spring elements which extend with their longitudinal cylinder axis in the vertical direction and are arranged next to one another. The cylinders or the hollow-cylindrical spring elements 14 can have different sizes, thicknesses, heights, etc., in order to achieve different spring effects on the upper side of the seat part 2. The section 13 is described in further detail in FIG. 3.

The upholstery foam section 16 has the typical shape of the upper side of a seat part 2, as is sufficiently known. This upholstery foam section 16 is covered from front to back with an upholstery cover 17 covering the entire surface and is thus covered.

Figure 3:
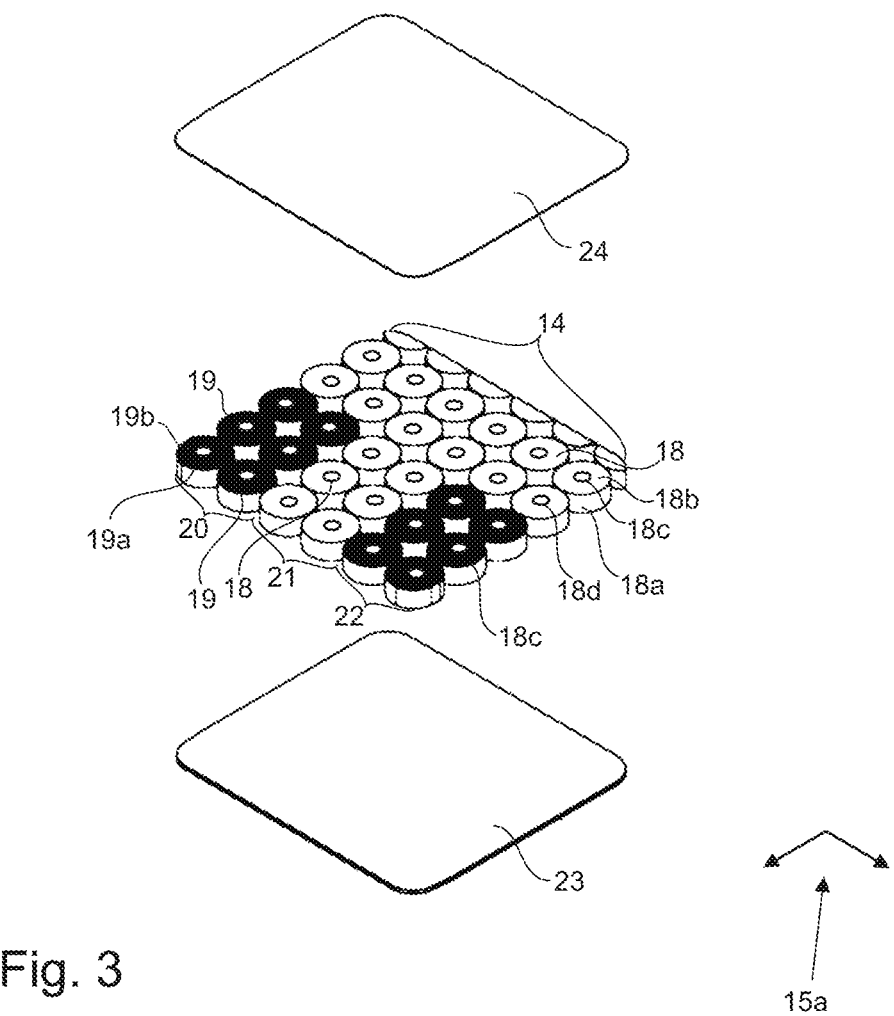
FIG. 3 in a perspective exploded view a section 13 according to FIG. 2.

In FIG. 3, the section 13 from FIG. 2 is reproduced in more detail in an exploded view 7. This illustration clearly shows that the individual hollow-cylindrical spring elements 14 are arranged next to one another and are covered on the top by a fleece layer 24 and on the underside by a foam mat 23.

Figure 4:
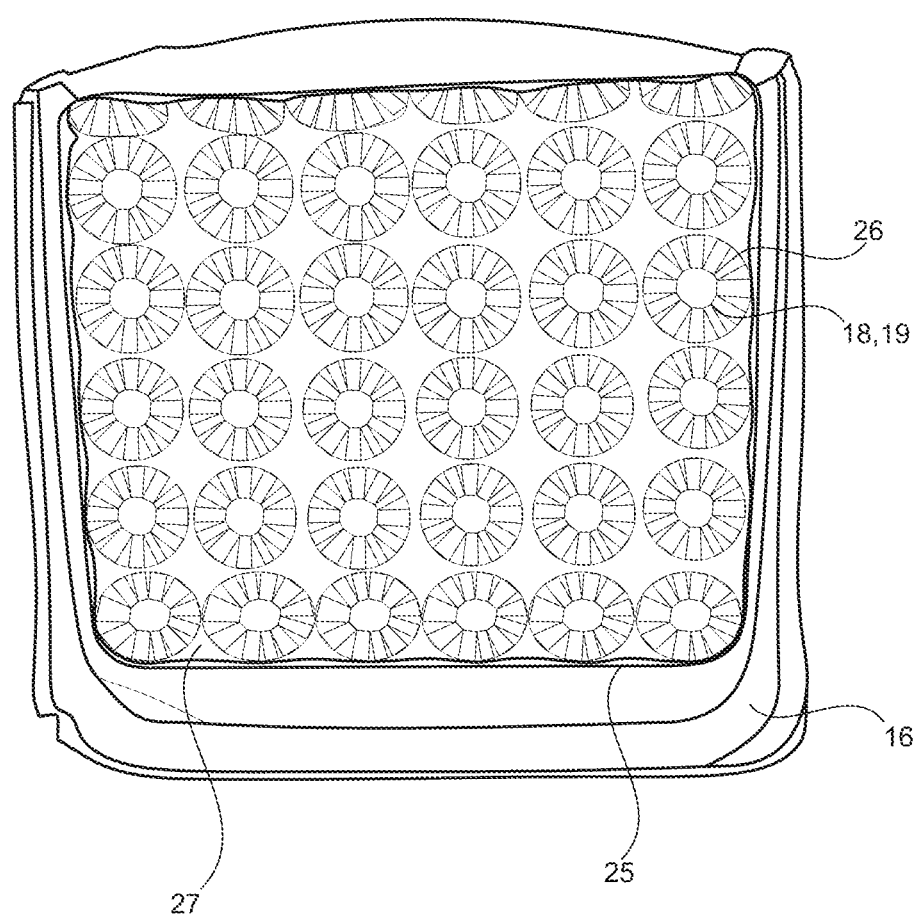
FIG. 4 in a bottom view of an upholstery foam section viewed from below with the spring elements according to the subject matter of the present invention.

The hollow-cylindrical spring elements 14 can also be made of foam and have various recesses and cavities, as shown, for example, by way of indication in FIG. 4. Each hollow-cylindrical spring element 14 or 18 has a cylindrical wall 18b with its end face and an outer surface 18a. A longitudinal hole 18c, which extends from top to bottom through the entire cylindrical shape, is disposed centrally. A longitudinal axis of each hollow cylindrical-shaped spring element is represented by reference numeral 18d.

Preferably, hollow-cylindrical spring elements with a different spring force or spring pressure can be arranged in the center of the seat, i.e. between the areas for depositing the upper legs of a seat user, than in the area for depositing the upper legs. This is illustrated by two different spring elements shown in color with the reference signs 18 and 19.

Hollow-cylindrical spring elements 19 associated with the upper legs can have a different front side 19b and a different outer side 19a in terms of size and/or structure. For example, the cylinder walls 18b and 19b may have interruptions in the form of slits as indicated in FIG. 4. Preferably, the spring elements 18 and 19 differ in their materials with respect to their different spring forces.

Thus, in the areas 20 and 22, spring elements of different design are arranged with respect to the spring force than in the area 21. For example, the three areas 20, 21 and 22 can have the same width. Alternatively, areas 20 and 22 can also be arranged to be continuous from left to right exclusively in the front area, i.e. in the front half of the seat part 2, whereas spring elements as per reference sign 18 are arranged exclusively in the rear area.

The foam mat 23, which is arranged on the underside, extends in the x and y direction according to the arrows 15a and preferably has a thickness from a range of 0.5-20 mm or preferably from an area of 1-10 mm. Preferably, this foam mat is formed with the same thickness in its planar extension. However, it may also have different thicknesses.

The fleece layer 24 with a thickness from an area of 0.1-0.5 mm is preferably arranged on the upper side of the many spring elements and extends over the entire area of the spring element extension.

Figure 3A:
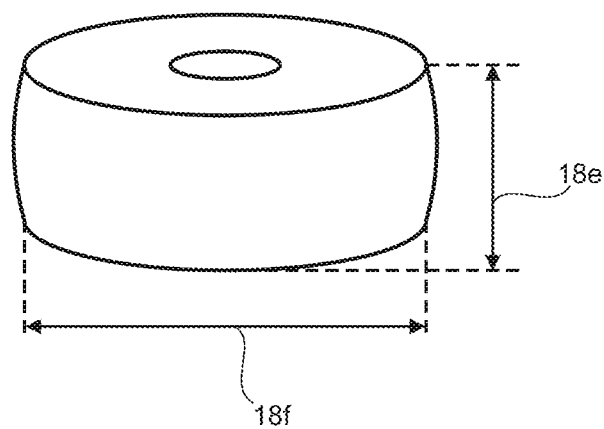
FIG. 3*a* a spring element.

FIG. 3a shows a detailed view of one of the hollow cylindrical spring elements. These hollow cylindrical spring elements have heights 18e and diameter values according to 18f. The heights 18e can be selected from an area of 1-100 mm, preferably from 5-50 mm, more preferably from 10-30 mm. The outer diameters 18f of the hollow cylindrical spring elements are preferably selected from an area of 5-300 mm, preferably from 10-100 mm, more preferably from 30-80 mm.

FIG. 4 shows a bottom view of the recess of the upholstery foam section 16. This upholstery foam section has a rim. It can be clearly seen from the illustration that each hollow-cylindrical spring element can have slot-like formations 26. The upholstery foam section 16 has a border in order to be able to form a recess within the upholstery foam section. This recess 25 is designed in such a way that various spring elements can be arranged next to one another in the upright position. These cylindrical spring elements form cavities 27 between the adjacent spring elements.

FIG. 5 shows a cross-sectional view of a seat part 2 according to the subject matter of the present invention. The seat part 2 has the hinges 12a and 12b already described above. A seat plate 8 is formed in such a way that it has individual sections 8b based on individual stiffeners 8a. An upwardly extending rim-side web 9 is arranged on this seat plate, which is intended to hold the spring elements 18, 19 in an orderly manner on the seat plate and surrounds the latter. Of course, this rim 9 can not only be formed circumferentially around all spring elements, but can additionally or instead also have individual sections within the area of the spring elements 18, 19 for stabilizing positioning of the spring elements.

Lateral wall-like areas 16a and 16b form the side walls of the recess 25 present within the upholstery foam section 16 and comprise not only the spring elements 18, 19 of hollow-cylindrical design but also the rim 9 of the seat plate 8 of fin-like design. These lateral areas 16a and 16b of the upholstery foam section 16, which extend from top to bottom, can have a smaller wall thickness 29 for optimum positioning of the seat plate in its lower area, in order to be able to position the seat plate well within the upholstery foam section 16.

All features disclosed in the application documents are claimed to be essential to the invention insofar as they are new, individually or in combination, compared to the prior art.

LIST OF REFERENCE SIGNS

1 Double track seat
2 Seat part
3 Backrest part
4 Armrests
5 Head rests or head parts
6 Foot
7 Exploded view; explosive view
8 Seat plate
9 Rim
10 Base plate
11 Perforated strip
12a Hinges
12b Hinges
13 Cutout
14 Spring element
15 Seat longitudinal direction
15a Seat plane
16 Upholstery foam section
16a Side wall
16b Side wall
17 Upholstery cover
18 Spring element
18a Outer surface
18b Cylinder wall
18c Longitudinal hole
18d Central longitudinal axis
18e Heights
18f Outer diameter
19 Spring element
19a Outer side
19b Cylinder walls
20 Area
21 Area
22 Area
23 Foam mat
24 Fleece layer
25 Recess
26 Wedge-shaped slits
27 Cavity
29 Wall thickness

What is claimed is:

1. A vehicle seat, in particular for rail transport, comprising:
a seat part;
a backrest part; and
a soft upholstery section arranged on at least one hard seat plate for upholstering a seat surface of the seat part, wherein the upholstery section has an upholstery cover on an upper side and an upholstery foam section, wherein an entire surface of the upholstery foam section is covered by the upholstery cover,
wherein the upholstery foam section has on its underside at least one recess in which a plurality of hollow-cylindrical spring elements made of foam material, arranged next to one another are embedded, and
wherein a foam mat extending in a seat plane of the seat part extends between an underside of the hollow-cylindrical spring elements and the seat plate.

2. The vehicle seat according to claim 1, wherein longitudinal axes of the hollow-cylindrical spring elements extend perpendicularly to a seat plane of the seat part.

3. The vehicle seat according to claim 1, wherein each hollow-cylindrical spring element has an external diameter in a range of 10 mm-100 mm.

4. The vehicle seat according to claim 1, wherein the foam mat has a thickness in a range of 0.5 mm-20 mm.

5. The vehicle seat according to claim 1, wherein each hollow-cylindrical spring element has an external diameter in a range of 30 mm-80 mm.

6. The vehicle seat according to claim 1, wherein cylinder walls of the spring elements, which are formed in a shape of a hollow cylinder, have numerous recesses and hollow chambers.

7. The vehicle seat according to claim 6, wherein the recesses are formed as slots which extend both in a vertical direction of the spring elements of hollow-cylindrical design and radially in a direction of a central longitudinal axis of each spring element.

8. The vehicle seat according to claim 1, wherein each hollow-cylindrical spring element has a height in a range of 1 mm-100 mm.

9. The vehicle seat according to claim 1, in that each spring element, which is of hollow-cylindrical design, has an external diameter in a range of 5 mm-300 mm.

10. The vehicle seat according to claim 1, wherein, as viewed in a seat longitudinal direction, the recess has spring elements arranged outside of a central area of the seat part with a higher spring pressure than spring elements in the central area of the seat part.

11. The vehicle seat according to claim 1, wherein the seat plate has at least one upwardly extending rim which surrounds the hollow-cylindrical spring elements or subdivides them and projects into the at least one recess.

12. The vehicle seat according to claim 1, wherein the foam mat has a thickness in a range of 1 mm-10 mm.

13. The vehicle seat according to claim 1, wherein each hollow-cylindrical spring element has a height in a range of 10 mm-30 mm.

14. The vehicle seat according to claim 1, wherein each hollow-cylindrical spring element has a height in a range of 5 mm-50 mm.

15. The vehicle seat according to claim 1, wherein a fleece layer having a thickness in a range of 0.05 mm-5 mm is arranged between the upper sides of the spring elements of hollow-cylindrical spring elements and the underside of the upholstery foam section.

16. The vehicle seat according to claim 15, wherein the fleece layer has a thickness in a range of 0.1 mm-0.5 mm.

17. A vehicle seat, comprising:
a seat part;
a backrest part; and
a soft upholstery section arranged on at least one hard seat plate for upholstering a seat surface of the seat part, wherein the upholstery section has an upholstery cover on an upper side and an upholstery foam section, wherein an entire surface of the upholstery foam section is covered by the upholstery cover,
wherein the upholstery foam section has on its underside at least one recess in which a plurality of hollow-cylindrical spring elements made of foam material and arranged next to one another are embedded, and
wherein, as viewed in a seat longitudinal direction, the at least one recess has spring elements arranged outside of a central area of the seat part with a higher spring pressure than spring elements in the central area of the seat part.

\* \* \* \* \*